June 27, 1939.  J. J. MUCHER  2,163,798
METHOD OF MOLDING
Filed April 23, 1936
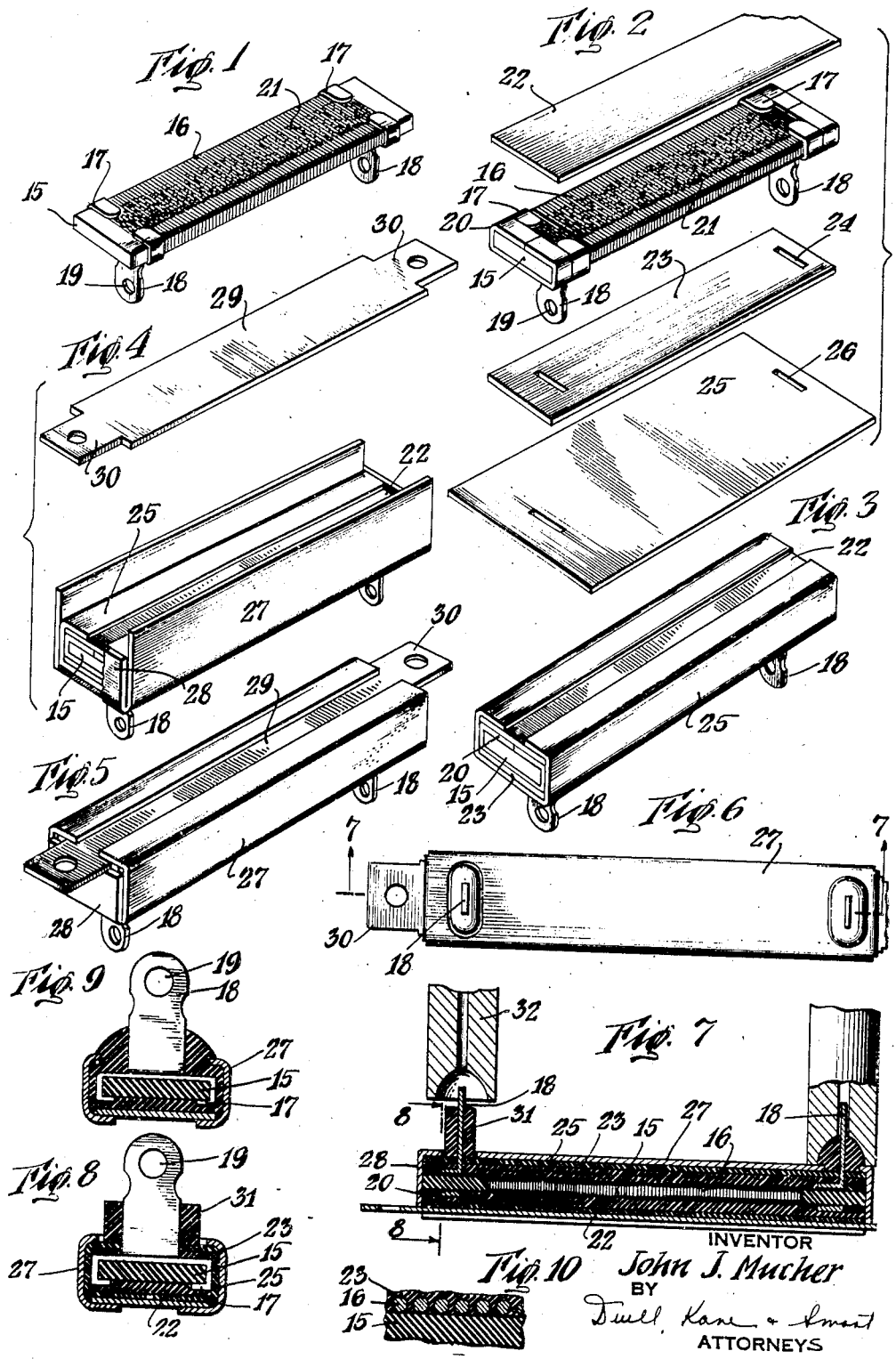
INVENTOR
John J. Mucher
BY
Dwell, Kane & Smart
ATTORNEYS Patented June 27, 1939

2,163,798

UNITED STATES PATENT OFFICE 2,163,798

METHOD OF MOLDING

John J. Mucher, Brooklyn, N. Y.

Application April 23, 1936, Serial No. 76,371

7 Claims. (Cl. 201—67)

This invention relates to an improved method of molding. While the teachings of the present invention may be followed to advantage in numerous fields of endeavor, the present process, in its more general aspects, aims to teach a method which may be practiced by relatively unskilled employees with ordinary and relatively inexpensive apparatus, and by means of which articles of superior quality and improved construction will be produced.

Detailed and preferred fields in which the teachings of the present invention may be followed with great profit are, for example, in connection with the construction of electrical appliances such as resistance units, terminal assemblies, solenoids, coils, condensers, and transformers. While in certain respects these present preferred groupings, it is to be understood that, except where otherwise indicated in the following claims, the method is not to be regarded as being limited to these fields, but rather is to be viewed as having wide application throughout various types of industries in solving manufacturing problems arising in their lines of potential production. Applicant's co-pending application filed September 2, 1936, Serial No. 99,024, discloses a modified type of insulation for resistors, together with a method of applying the same, which in certain respects can be successfully utilized in conjunction with the present invention.

To those skilled in the art of molding, where a substance such as a synthetic resin of the phenol formaldehyde type (commonly known as "Bakelite") is involved, certain practical difficulties have heretofore presented themselves. One of the major difficulties has been that involving the cost of molds and dies. Of course, where large quantity production is contemplated in connection with an article or unit of a single type, such tool costs are of relatively small importance, for the reason that if a sufficiently high rate of production is maintained, the cost of the molds and dies is eventually absorbed. However, where numerous types and modifications of an article or unit are contemplated, each differing from other units in major or minor respects, the manufacturer is confronted with either an impossible, or else a relatively high tool cost before production can begin. This, of course, has either resulted in abandoning any thought of producing the desired article, or else has called for the sale of such article at a relatively high price.

It is a primary object of the present invention to teach a method of procedure whereby it is entirely feasible to dispense with certain of the molds and dies heretofore regarded as essential.

Another object is that of teaching a method whereby the conjoint use of heat and pressure during the molding operation which has heretofore been deemed essential may be dispensed with and both pressure and heat may, if desired, be separately applied to the product in the order named.

A further object of the invention is that of providing a process or method, the teachings of which may be readily followed by relatively unskilled workers without using expensive or complicated apparatus. In fact, as presently viewed, it is entirely feasible to eliminate certain of the mechanisms and manufacturing steps heretofore regarded as essential, thus effecting a material saving quite aside from and in addition to the saving effected by not being under the necessity of furnishing special dies and molds.

An additional object is that of teaching a method resulting in the production of articles or units which will have characteristics at least equal and in certain respects superior to similar articles produced by the accepted steps of employing special dies and molds and utilizing the skilled labor and expensive machinery which is more or less an essential incident to the employment of these special tools.

A still further object is that of teaching a method by means of which articles may be produced in large quantities and at a high rate of speed. Accordingly, such articles or units may be sold at a relatively nominal figure.

Another object is that of teaching a method which is not necessarily limited to the use of a molded substance such as a resin of the phenol formaldehyde type. In fact, any material having the thermo-setting and other characteristics applicable to the teachings of the present invention may be profitably employed. However, as at present viewed, it is to be understood that the moldable substance commonly known as "Bakelite" is, in certain respects, a preferred material and ideally suited for use in connection with the present method.

With these and other objects in mind, reference is had to the attached sheet of drawings illustrating the method as employed to produce a resistance element. It is to be appreciated that these views, as well as the following specification, are to be regarded as merely illustrative rather than in a limiting sense; thus Fig. 1 is a perspective view of a resistance;

Fig. 2 is an exploded perspective view of certain elements which may be associated with the resistance and in accordance with the teachings of the present invention;

Fig. 3 is a perspective view of the resistance with the elements in applied position;

Fig. 4 is an exploded perspective view of certain additional elements applied to the resistance as illustrated in Fig. 3;

Fig. 5 is a perspective view with these additional elements in applied position;

Fig. 6 is a face view of the assembled resistance unit as shown in Fig. 5;

Fig. 7 is a sectional view taken along the lines 7—7, and in the direction of the arrows as indicated in Fig. 6, and showing a further step in the manufacture of the unit;

Fig. 8 is a transverse sectional view taken along the lines 8—8 and in the direction of the arrows as indicated in Fig. 7;

Fig. 9 is a view similar to Fig. 8, but showing the unit after it has been subjected to a final step; and Fig. 10 is a fragmentary enlarged sectional view disclosing in detail the manner in which the moldable substance is finally disposed with reference to the individual windings of the resistance.

In these views the numeral 15 indicates a strip formed of any suitable material such as "Bakelite" and around the body of which a winding 16 of wire is disposed. The convolutions of wire adjacent the ends of the resistance body may be engaged by metallic clips 17, from which extend terminals 18, formed, for example, with lead-receiving apertures 19.

In this manner a resistance element of a proper type is provided according to accepted manufacturing methods. As afore brought out, the present drawing is intended to be merely illustrative, and with this in mind a simple form of resistance has been shown. Obviously, the body of the strip 15 might be of any desired length and any suitable number of terminals might be connected to the windings thereon at any desired points and according to the resistance value to be imputed to those terminals. However, in the interest of simplicity of illustration, merely this elementary form of resistance has been shown.

According to the next step which may be followed pursuant to the teachings of the present invention, strips of absorbent cellulose pulp or the like impregnated with a solution of phenol formaldehyde or other similar thermo-setting material are applied as indicated at 20 to those portions of the strips 15 which extend beyond the windings 16. The strips 20 may in certain instances be dispensed with, although as will be hereinafter apparent it is preferable that they be supplied. Also, at the time of their application or prior thereto, the windings 16 may receive a coating or coatings of varnish of the phenol formaldehyde type. As shown at 21, the varnish may be applied to the opposite faces of the resistance adjacent the central zones thereof. However, the zone of application may be increased or diminished, or dispensed with entirely, as desired, without departing from the teachings of this invention.

Strips 22 and 23 formed of the same material as strips 20, may now be applied to the resistance. The area of each of these strips is preferably equal to the area of the resistance including the area of strips 20 and clips 17. Strip 23 should, of course, have slots 24 formed in its body and through which the terminals may extend. Arranged beyond one of these strips, and preferably the strip 23, is an envelope 25 which may conveniently be formed of a material similar to that from which strips 22 and 23 are formed. In the event that the envelope 25 lies adjacent the strip 23, it should have openings 26 for the passage of terminals 18.

The strips, 20, 22, and 23, as well as envelope 25, are preferably treated with a solvent such as alcohol or the like, to render them plastic, prior to their application to the resistance unit. Such application, of course, includes the placement of strip 22 upon one face of the unit, the placement of strip 23 upon the opposite face of the unit, the placement of envelope 25 upon, for example, the strip 23, and the folding of the envelope material to enclose the assembly, as, for example, in the manner shown in Fig. 3. This folding and association of the parts may, of course, be accomplished either by hand or any obvious suitable form of press, it being apparent that no special procedure is called for.

Given a unit of the nature shown in Fig. 3, it is intended, according to the present invention, to enclose the same within a suitable shell, preferably formed of metal and having characteristics such that it will be affected little, if at all, by exposure to heat, moisture, or otherwise. The main portion of such a shell has been shown in Fig. 4, and includes a body formed of a blank of an area such that side flaps 27 and end flaps 28 are furnished. The length of the end flaps may be substantially equal to the height of the unit as viewed in Fig. 3. The length of the side flaps 27 should, however, be at least sufficient to not alone equal the height of the unit as shown in Fig. 3, but allow for excess material such that these flaps adjacent their edges may be bent inwardly to overlie the unit. The shell may also include a subsidiary base portion including a strip 29 having reduced, perforated end portions 30. The length of the main body of strip 29 is equal to the length of the unit as viewed in Fig. 3.

Accordingly, with the parts positioned as in Fig. 4, strip 29 may be placed to overlie the inwardly extending edge portions of envelope 25. Thereafter, the assembly may be positioned within a power press, or may otherwise be manipulated so that the ends of side flaps 27 overlie strip 29 and hold the entire assembly as viewed in Fig. 3 in a state of compression. Under these circumstances, and as shown in Fig. 5, the reduced end portions 30 will project beyond the unit. In the manufacture of resistance units and similar products, it is important in the assembly operation just described, that the strip 29 maintain its flat plane and thus prevent internal warping of the parts. Of course in the case of other products, this detail may be of no importance whatsoever.

If the unit is viewed from the terminal end, it will be understood that a shell face will be visible which will be interrupted merely by openings which are not alone of an area adequate to permit of the passage of the terminals 18, but, in fact, present an excess area.

It is to be remembered that after assembly the shell is maintaining all of the parts under conditions of compression. Accordingly, these parts may now be subjected to the action of heat, so that the thermo-setting phenol formaldehyde comprising the bodies 20, 22, 23 and 25, as well as coatings 21, reacts chemically and, in effect, merges into one homogeneous and integral body portion. One method of effectively subjecting the parts to the action of heat is, for example, by placing them in an oven, or equivalent unit, for a proper length of time. It has been found that a proper degree of heat is 340° F., and that the period of time may safely be held down to three minutes. An effective substitute for the oven may be found in applying electric current of proper value to the terminals 18 for a proper period of time, to cause the resistance coil 16 to heat the parts. It is, of course, to be understood that the moldable material need not necessarily be provided in the form of impregnated strips. This material might be supplied in puverized form in accordance with accepted standards. Also, the number of strips of impregnated material or the quantity of pulverized material used will vary with each use. Obviously, after the pressure step, the layers or body of the material fill substantially all voids, and the shell defines the shape and area of the finished article.

Regardless, however, of the method of composition and heat treatment, a unit results which, in the example under consideration, includes a suitably mounted resistor imbedded in a surrounding layer of material having high dielectric and heat-dissipating qualities. In fact, as viewed in Fig. 10, the material will key between the individual convolutions of the windings 16, and thus there will be provided one merged homogeneous body.

Consequently, a resistance is furnished which includes a metallic and protective shell having end portions 30, by means of which it may be conveniently mounted by or suspended from any proper surface and beyond which there extends any desirable number of terminals which will be readily accessible. The moldable material will have formed ample protective layers extending between all portions of the resistance and adjacent such shell surfaces to effectively preclude any possibility of moisture creeping along the surface of the metallic shell and reaching the windings of the resistance. Any probability of "thin spots" existing which would destroy the effectiveness of the protective layers is precluded by virtue of the continuing pressure from the metallic shell to which all layers are subjected until at least after the heating step.

While the completed resistance unit formed as heretofore described is an efficient and complete product in which molding material, during the application of heat, will flow into the space between the terminals 18 and the openings in the shell 27 so as to form an insulating bond therebetween, nevertheless in certain instances it is desirable that the terminals themselves be additionally imbeded in molded material. In such contingency and as viewed in Figs. 7, 8 and 9, pellets 31, in the form of collars, may be placed over the terminals 18 and extend through the shell openings into contact with the outer face of envelope 25, as shown particularly in Fig. 8. These pellets at the time of the application of heat to the assembled unit or at any other convenient period in the manufacturing process, may be shaped as, for example, by plungers 32, which will mold them to assume proper configurations. Such a configuration is shown in the right hand side of Fig. 7 and in Fig. 9.

In certain instances it might be desired to dispense with the shell. This may obviously be accomplished after the unit has been completely formed by, for example, stripping the shell from the unit. However, in most instances it will be desired to leave the shell in position as an integral and permanent part of the unit. In any event, it will be apparent that expensive molds and dies will not be necessary in the formation of a highly satisfactory and desirable unit or article.

It is apparent that by means of this method it is not necessary to simultaneously apply pressure and heat. Rather, as heretofore pointed out, the parts may be initially subjected to and maintained under pressure, and these parts may thereafter be subjected to heat. It will be equally apparent, however, that if it were desired to simultaneously apply pressure and heat, the press or other apparatus which serves to bring the parts of the shell to their final position, might be caused to subject these parts to heat. Under these circumstances, the pellets 31, if they were deemed desirable, could be applied at or about the time the parts reach the condition of assembly shown in Fig. 4.

In viewing the invention from the specific disclosure herein presented, a resistance element is furnished which is substantially impervious to water in which heat is readily dissipated.

Also, as previously brought out, it is to be strictly understood that except where otherwise indicated in the following claims, the teachings of the present invention may be partially or wholly followed to furnish innumerable types of articles both in the electrical field as well as in fields foreign thereto, without having to employ expensive die and mold equipment, or without having to use the relatively expensive machinery which is incidental to the employment of tools of such a nature. Finally, it is to be understood that while the claims, of necessity, define a certain sequence of steps, these steps need not necessarily be followed in such sequence.

Having described my invention, what I claim as new and desire to secure by Letters Patent is:

1. A method of producing an electrical resistor of the type permanently embedded in an insulating body and encased in a metal shell which embraces the following steps in its production, winding electrical resistance wire of predetermined size and at a predetermined pitch on a dielectric core, securing terminal members thereto, enclosing said core and winding in a wrapping of fibrous material impregnated with a thermo-setting resin so as to permit the projection of terminal members therefrom, constricting a metal shell about such article by the application of external force, so that said shell will continue to maintain the parts under pressure after the external constricting force has been removed, and thereafter subjecting the article to sufficient heat for a sufficient time to harden the thermo-setting insulation so as to produce a unitary electrical resistor.

2. A method of producing an electrical resistor of the type permanently embedded in an insulating body and encased in a metal shell which embraces the following steps in its production, winding electrical resistance wire of predetermined size and at a predetermined pitch on a dielectric core, securing terminal members thereto, enclosing said core and winding in a wrapping of fibrous material so as to permit the projection of terminal members therefrom, impregnating the unit with a thermo-setting resin, constricting a metal shell about such article by the application of external force, so that said shell will continue to maintain the parts under pressure after the external contricting force has been removed, and thereafter subjecting the article to sufficient heat for a sufficient time to harden the thermo-setting insulation so as to produce a unitary electrical resistor.

3. A method of producing an electrical resistor of the type permanently embedded in an insulating body and encased in a metal shell which embraces the following steps in its production, winding electrical resistance wire of predetermined size and at a predetermined pitch on a dielectric core, securing terminal members thereto, enclosing said core and winding in a wrapping of fibrous material impregnated with a thermo-setting resin so as to permit the projection of terminal members therefrom, constricting a metal shell about such article by the application of external force, so that said shell will continue to maintain the parts under pressure, and simultaneously subjecting the article to sufficient heat for a sufficient time to harden the thermo-setting insulation so as to produce a unitary electrical resistor.

4. A method of producing an electrical resistor of the type permanently embedded in an insulating body and encased in a metal shell which embraces the following steps in its production, winding electrical resistance wire of predetermined size and at a predetermined pitch on a dielectric core, securing terminal members thereto, inserting said terminal members in accommodating apertures in an insulating wrapping of fibrous material that is impregnated with a thermo-setting resin, enclosing said core and winding in said wrapping, inserting said unit in a metal shell having apertures therein to accommodate the said terminal members, constricting said metal shell about said unit by the application of external force, so that said shell will continue to maintain the parts under pressure after the external constricting force has been removed, and thereafter subjecting the article to sufficient heat for a sufficient time to harden the thermo-setting insulation so as to produce a unitary electrical resistor.

5. A method of producing an electrical resistor of the type permanently embedded in an insulating body and encased in a metal shell which embraces the following steps in its production, winding electrical resistance wire of predetermined size and at a predetermined pitch on a dielectric core, securing terminal members thereto, inserting said terminal members in accommodating apertures in an insulating wrapping of fibrous material, enclosing said core and winding in said wrapping, impregating the unit with a thermo-setting resin, inserting said unit in a metal shell having apertures therein to accommodate the said terminal members, contricting said metal shell about said unit by the application of external force, so that said shell will continue to maintain the parts under pressure after the external constricting force has been removed, and thereafter subjecting the article to sufficient heat for a sufficient time to harden the thermo-setting insulation so as to produce a unitary electrical resistor.

6. A method of producing an electrical resistor of the type permanently embedded in an insulating body and encased in a metal shell which embraces the following steps in its production, winding electrical resistance wire of predetermined size and at a predetermined pitch on a dielectric core, securing terminal members thereto, inserting said terminal members in accommodating apertures in an insulating wrapping of fibrous material that is impregnated with a thermo-setting resin, enclosing said core and winding in said wrapping, inserting said unit in a metal shell having apertures therein to accommodate the said terminal members, constricting said metal shell about said unit by the application of external force, so that said shell will continue to maintain the parts under pressure after the external contricting force has been removed, molding insulating buttons of thermo-setting resin around said projecting terminals at the bases thereof, and thereafter subjecting the article to sufficient heat for a sufficient time to harden the thermo-setting insulation so as to produce a unitary electrical resistor.

7. A method of producing an electrical resistor of the type permanently embedded in an insulating body and encased in a metal shell which embraces the following steps in its production, winding electrical resistance wire of predetermined size and at a predetermined pitch on a dielectric core, securing terminal members thereto, inserting said terminal members in accommodating apertures in an insulating wrapping of fibrous material that is impregnated with a thermo-setting resin, enclosing said core and winding in said wrapping, inserting said unit in a metal shell having apertures therein to accommodate the said terminal members, constricting said metal shell about said unit by the application of external force, so that said shell will continue to maintain the parts under pressure, molding insulating buttons of thermo-setting resin around said projecting terminals at the bases thereof, and simultaneously with the molding of said buttons, subjecting the article to heat for a sufficient time to harden the thermo-setting insulation so as to produce a unitary electrical resistor.

JOHN J. MUCHER.